Patented Apr. 28, 1953

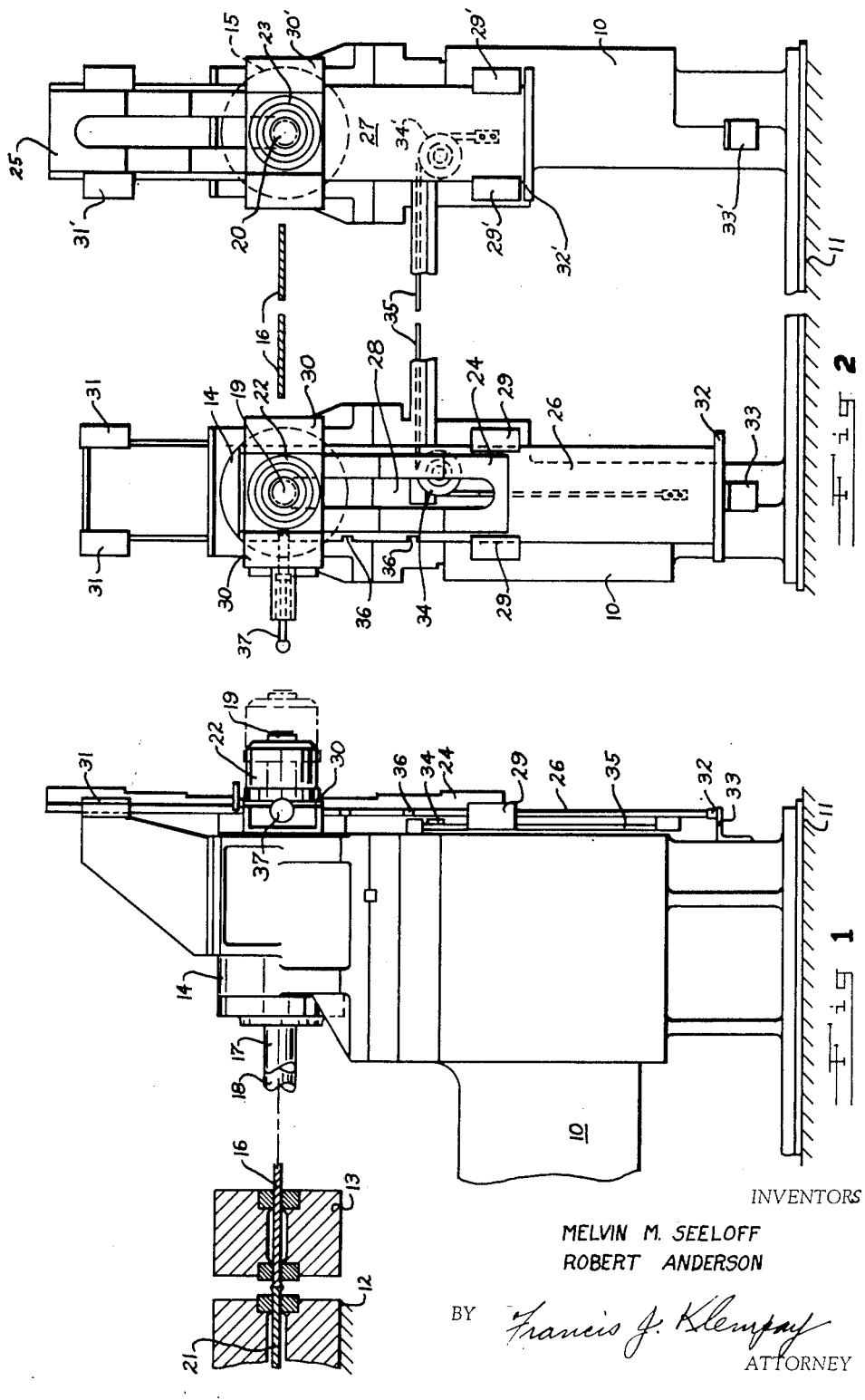

2,636,966

UNITED STATES PATENT OFFICE 2,636,966

DIE SPACING MEANS FOR WELDING APPARATUS

Melvin M. Seeloff and Robert Anderson, Warren, Ohio, assignors to The Taylor-Winfield Corporation, Warren, Ohio, a corporation of Ohio Application May 5, 1952, Serial No. 286,042

11 Claims. (Cl. 219—4)

1

The present invention relates to electric resistance welding apparatus, and more particularly to an improved arrangement for controlling and adjusting the final separation of welding dies in flash-butt strip welding operations and the like.

End-to-end flash-butt welding of metal workpieces is conventionally carried out by gripping the workpieces in relatively movable current conductive dies and causing the dies to move together in a controlled pattern of movement whereby the ends of the workpieces are first "flashed" to burn off excess metal and to soften and prepare the remaining metal for joining, whereupon the dies are rapidly moved together to "upset" the softened end portions to effect a fusion bonding of the workpieces.

In order that the welding operation be properly accomplished it is necessary to accurately control not only the pattern of movement of the dies during flashing, but the final separation of the dies, or die opening, at the end of the upset operation. This is particularly true where the workpieces are relatively thin and flexible, as for example in the end-to-end welding of thin metal strip.

Heretofore adjustment and control of final die opening has been commonly provided by means of "bucking nuts" or equivalent devices associated with the die moving means, the latter of which are usually in the form of large diameter hydraulic actuating devices—commonly referred to as "upset cylinders." Any desired final die spacing may be achieved by rotating the bucking nuts on extending threaded portions of the upset cylinder shafts whereby the nuts engage fixed stops when the dies move into a predetermined final position.

This arrangement is not entirely satisfactory for some flash-butt welding applications, however, since it is not always possible to position the bucking nuts in a readily accessible position, and accordingly the adjustment is often difficult and time consuming. This is particularly true in the welding of wide sheet and strip stock where a pair of widely spaced upset cylinders is utilized to drive the movable die member, making it necessary to accurately duplicate the spacing adjustment for each cylinder.

Accordingly, it is the ultimate object of this invention to provide an improved arrangement for adjusting the final die spacing of flash-butt strip welders and the like whereby adjustments may be accurately accomplished in a practical minimum of time. Thus, in a continuous strip processing line, for example, suitable adjustments to adapt the welding apparatus for welding strip of various thicknesses may be readily made without slowing down or otherwise interfering with the normal operation or continuity of the line. This is a factor of extreme importance in the economical operation of long and complicated

2 processing lines as may be readily appreciated.

Another object of this invention resides in the provision of a flash-butt strip welder for wide strip material of an improved arrangement for adjusting the final spacing of the welding dies whereby accurate equal adjustment may be effected for a pair of widely spaced upset cylinders by a single operator stationed at one side of the welding apparatus. It is thus unnecessary to have an operator stationed at each side of the machine, or for a single operator to crawl back and forth under the strip line to perform the necessary operations.

Yet another object of the present invention is the provision of apparatus for the purpose, and having the characteristics enumerated above, which is further arranged so that a single operator may readily manipulate the adjusting mechanism without the aid of air or hydraulic cylinders or other power actuating devices. In large welding apparatus, utilizing high power platen moving upset cylinders it is often necessary that the die spacing apparatus be of substantial mass and strength and accordingly difficult to manipulate without the aid of power devices. By our invention, however, all moving parts of the adjusting apparatus are arranged for vertical movement and are effectively counterbalanced without the use of additional external counterbalancing weights whereby a single operator may readily manipulate the apparatus manually.

The above and other objects and advantages of the invention will become apparent upon full consideration of the following detailed specification and accompanying drawing wherein is disclosed a preferred embodiment of our invention.

In the drawing:

Figure 1 is a fragmentary side elevation of a conventional flash-butt welding machine for end-to-end welding of wide strip and sheet wherein is incorporated apparatus according to our invention for controlling and adjusting the final spacing of the welding die members; and Figure 2 is a fragmentary end elevation of the welding machine of Figure 1 illustrating in further detail our novel die spacing apparatus.

Referring initially to Figure 1, the numeral 10 designates a rigid base of the welding machine which is supported upon a suitable foundation 11 in alignment with a strip processing line, for example, not shown. In accordance with usual welder construction a first pair of welding dies 12 is mounted in normally fixed relation to the base 10, and a second pair of dies 13 is mounted on the base 10 for slidable movement toward and away from the fixed dies 12.

In the illustrated welding machine the movable dies 13 are moved toward and away from dies 12 by means of a pair of spaced upset cylinders 14 and 15 which are connected by the dies 13 by suitable means, not shown. The upset cylinders 14 and 15 are rigidly mounted on the machine base 10, preferably at such a height that the axes thereof lie in the plane of the strip line. As indicated in Figure 2, the cylinders 14 and 15 are positioned in straddling relation to the strip 16; it being understood of course that the width of such strip 16 may be as great as one hundred inches in certain instances.

Each of the upset cylinders 14 and 15 conventionally comprises a cylinder part and a piston part movable longitudinally therein, and in accordance with the principles of the invention the cylinders 14 and 15 are provided with piston rods 17 and 18 respectively extending forwardly of the cylinders, and rods 19 and 20 respectively extending rearwardly of the cylinders.

Cylinders 14 and 15 are adapted to be simultaneously actuated from a suitable fluid source, not shown, whereby the movable dies 13 may be caused to move forwardly or rearwardly in the manner desired.

In a normal welding operation the dies 13, with strip 16 clamped firmly therein are caused to move progressively forward at a controlled rate toward a second strip workpiece 21 clamped in the fixed dies 12 whereby the ends of the workpieces 16 and 21 are flashed off and prepared for joining. After a predetermined flashing period full fluid pressure is applied to cylinders 14 and 15 to cause rapid forward movement of the dies 13 to upset the workpieces and form the weld. In accordance with good welding practice the movable dies 13 must be stopped when a predetermined distance from the fixed dies 12, depending among other factors upon the thickness of the material being welded, and by the present invention this is accomplished by providing bucking nuts 22 and 23 which are preferably rigidly secured to rods 19 and 20 respectively, although where desired the nuts 22 and 23 may be adjustably secured to rods 19 and 20, as by threaded engagement for example.

Thus when fluid pressure is applied to the right hand end of cylinders 14 and 15 to cause forward movement of dies 13, bucking nuts 22 and 23 move forwardly along with the rods 19 and 20. To provide a rigid limit stop for dies 13 we may merely interpose a rigid abutment between each nut 22 or 23 and the cylinder 14 or 15 associated therewith whereby upon a predetermined forward movement nuts 22 and 23 will engage such abutment and further movement will be prevented regardless of the continued application of fluid pressure to the upset cylinders 14 and 15. To quickly adjust the forward limit position of the bucking nuts 22 and 23 abutments of various thicknesses may be provided which may be interchanged when necessary or desirable.

By the present invention we have provided abutment means in the form of vertically disposed elongated plates 24 and 25 which are flat on one side for mounting upon elongated flat guide members 26 and 27 respectively. The exposed faces of abutment plates 24 and 25 are provided with a plurality of stepped gage faces as shown in Figure 1 which are adapted to be selectively interposed between bucking nuts 22 and 23 and corresponding upset cylinders 14 and 15 whereby to provide a plurality of upset limit stops for use under various welding conditions.

Abutment plate 24 is secured to guide member 26 at the upper end portion thereof, and it will be observed in Figure 2 that both the abutment 24 and guide member 26 are provided longitudinally with an elongated slot 28 which is adapted to receive the rod 19. The arrangement is such that the stepped abutment plate 24 may be moved transversely to the rod 19 to present any of its plurality of gage faces to bucking nut 22.

To guide the movement of abutment plate 24 we have provided spaced guides 29, 30 and 31 which cooperate with the guide plate 26 to confine the abutment to movement in a vertical direction. As appears in the illustration, guides 29—31 are rigidly mounted in relation to the base 10, and the centrally positioned guide 30 is preferably positioned adjacent the right hand end of cylinder 14 so that the guide plate 26 may be maintained in direct contact with the end surface of the cylinder. Thus, when bucking nut 22 moves forwardly into contact with one of the gage faces of abutment plate 24 it is positively prevented from further forward movement. And by merely shifting the guide plate and abutment assembly in a vertical direction so as to present a new gage face for engagement with the bucking nut 22 the forward limit position or final die opening may be adjusted to suit the requirements of the operation.

Abutment plate 25 is secured to the upper end portion of guide plate, and as abutment plate 24, is guided for vertical movement only by guides 29', 30' and 31'. The general arrangement in each case is substantially the same with the important exception that while (as shown in Figure 1) the gage faces of abutment 24 increase in thickness from top to bottom, the gage faces of abutment 25 decrease in thickness from top to bottom. Thus, where the apparatus is positioned as shown in Figure 2, with abutment plate 24 in its lowermost limit position and abutment plate 25 in its uppermost limit position, each of the plates 24 and 25 presents its thinnest gage face for engagement with the associated bucking nut. The corresponding gage faces are, of course, of equal thickness so that the dies 13 are not caused to skew and bind.

Upper and lower limit positions are defined for each of the abutment plates 24 and 25 by means of transversely disposed stop members 32 and 32' which are secured to the lower ends of guide plates 26 and 27 respectively which engage guides 29 or 29' to define upper limit positions, and engage stops 33 and 33' to define lower limit positions.

To facilitate manual vertical movement of the abutment plates 24 and 25 we have interconnected the same by means of a cable 35 which is secured at each end to the lower end portion of each guide plate 26 and 27. The cable 35 extends substantially vertically upwardly from its point of connection with each of the plates 26 and 27, and extends from one side of the base 10 to the other over pulleys 34 and 34'. Thus each of the abutment assemblies effectively counterbalances the other, and by means of the positive interconnection afforded by cable 35, movement of one assembly so as to present a new gaging face for engagement also causes corresponding oppositely directed movement of the other assembly to present a corresponding gaging face. An operator stationed at the left hand side of the apparatus, for example, has merely to appropriately manipulate abutment plate 24 into a desired vertical relation to the bucking nut 22, and the remotely positioned abutment plate 25 is automatically positioned accordingly.

For locking the abutment plates 24 and 25 in any adjusted position we have provided a plurality of spaced notches 36 in the edge of guide plate 26 for engagement with a retractible index pin 37 which is carried by the machine base 10. In the illustrated apparatus index pin 37 is mounted adjacent shaft 19 and is provided with suitable spring means, not shown, to constantly urge the pin 37 toward the shaft 19. Notches 36 are so arranged that when one of the same are engaged by the pin 37, one of the gage faces is properly centered with respect to the bucking nut 22. A corresponding gage face of abutment plate 25 is also properly centered with respect to bucking nut 23 as will be apparent.

To readjust the apparatus an operator merely retracts index pin 37 and shifts abutment plate 24 to a new index position, whereupon he releases the pin 37 to lock the apparatus in the desired new position.

The advantages of our invention should now be manifest. We have provided a simple and accurate arrangement for adjusting the final die spacing of flash welding apparatus which is particularly adapted for use in continuous strip processing lines, for example, where slow-down or stoppage of the line cannot be tolerated, and accordingly where such adjustments must be made in an absolute minimum of time.

Our apparatus is intended particularly for use on welding machines wherein widely spaced upset cylinders are utilized to control the movement of a single platen. Any adjustments therefore, which affect or limit the movement of the upset cylinders must be substantially identical with respect to each of the cylinders. And in view of the teachings of our invention this may be accomplished with ease and rapidity heretofore unobtainable.

Manual operation from one side of the machine of adjusting apparatus positioned on both sides of the machine is readily accomplished with our apparatus whereas heretofore such operation was not practical, particularly where the machine is of large capacity as is required in many modern strip line installations.

Although our description has been limited to a single preferred embodiment of the invention, it will be understood that many of the specific features described are merely illustrative and may be modified within the scope of the invention. Reference should therefore be had to the appended claims in determining the true scope of the invention.

We claim:

1. In electric resistance flash-butt welding apparatus of the type having fixed and movable work-holding platens, spaced first and second upset cylinders for moving said movable platen toward and away from said fixed platen, and rearwardly extending shafts and bucking nuts associated with each of said upset cylinders for limiting the forward movement of said movable platen toward said fixed platen; the combination of a first vertically disposed elongated abutment plate interposed between said first upset cylinder and bucking nut, means to guide said first abutment plate in vertical movement with respect to said first cylinder, said abutment plate having a plurality of stepped gage faces thereon of progressively increasing thickness from top to bottom, a second vertically disposed elongated abutment plate interposed between said second upset cylinder and bucking nut, means to guide said second abutment plate in vertical movement with respect to said second cylinder, said second abutment plate having a plurality of stepped gage faces thereon of progressively decreasing thickness from top to bottom, said abutment plates each being substantially of the same weight, and means interconnecting said first and second abutment plates operative when one of said abutment plates is moved in a first vertical direction to move the other of said abutment plates in the other vertical direction, said last mentioned means and said plates being so oriented that corresponding gage faces of each abutment plate will move into operative position upon movement of one abutment plate to place a gage face in operative position.

2. In electric resistance flash-butt welding apparatus of the type having fixed and movable platens, spaced first and second upset cylinders for moving said movable platen toward and away from said fixed platen, and rearwardly extending shafts and bucking nuts associated with each of said upset cylinders for limiting the forward movement of said movable platen toward said fixed platen; the combination of a first vertically disposed elongated abutment plate interposed between said first upset cylinder and bucking nut, means to guide said first abutment plate in vertical movement with respect to said first cylinder, said abutment plate having a plurality of stepped gage faces thereon of progressively increasing thickness from top to bottom, a second vertically disposed elongated abutment plate interposed between said second upset cylinder and bucking nut, means to guide said second abutment plate in vertical movement with respect to said second cylinder, said second abutment plate having a plurality of stepped gage faces thereon of progressively decreasing thickness from top to bottom, and means responsive to movement of said first abutment plate to place any of said gage faces in operative position with respect to said first upset cylinder and bucking nut to move said second abutment plate to place a corresponding gage face in operative position with respect to said second upset cylinder and bucking nut.

3. In electric resistance flash-butt welding apparatus of the type having fixed and movable work-holding platens, spaced first and second upset cylinders for moving said movable platen toward and away from said fixed platen, and rearwardly extending shafts and bucking nuts associated with each of said upset cylinders for limiting the forward movement of said movable platen toward said fixed platen; the combination of a first elongated abutment plate interposed between said first upset cylinder and bucking nut, means to guide said first abutment plate in longitudinal sliding movement, said first abutment plate having longitudinally disposed gage face portions of progressively changing thickness, a second elongated abutment plate interposed between said first upset cylinder and bucking nut, means to guide said second abutment plate in longitudinal sliding movement, said second abutment plate having longitudinally disposed gage face portions of progressively changing thickness, and means interconnecting said first and second abutment plates operative in response to longitudinal movement of said first abutment to place a certain of said gage face portions in operative position with respect to said first upset cylinder to move said second abutment to place a corresponding gage face portion in operative position with respect to said second upset cylinder.

4. Apparatus according to claim 3 further characterized by said first and second abutment plates being vertically disposed, said first abutment plate having gage face portions of progressively increasing thickness from top to bottom, said second abutment plate having gage face portions of progressively decreasing thickness from top to bottom, and said means interconnecting said first and second abutment plates comprising a cable-like member secured to the lower end portion of each of said abutment plates and fixed pulley-like members positioned in fixed relation to each of said plates substantially above the end portion thereof, said cable-like member extending between said first and second abutment plates and over said pulley-like members.

5. Apparatus according to claim 4 further characterized by manually retractible index means adapted to engage one of said abutment plates in any of a plurality of predetermined gaging positions whereby to rigidly retain said one of said abutment plates in a desired position.

6. In electric resistance flash-butt welding apparatus of the type having fixed and movable work-holding platens, spaced first and second upset cylinders for moving said movable platen toward and away from said fixed platen, and means including abutment means associated with each of said upset cylinders for limiting the forward movement of said movable platen toward said fixed platen; the improvement in said abutment means which comprises a first vertically disposed elongated abutment plate associated with said first upset cylinders, means to guide said first abutment plate in vertical movement, said first abutment plate having longitudinally disposed gage face portions thereon of progressively increasing thickness from top to bottom, said first abutment plate and said first upset cylinder being so arranged that said gage face portions operate to rigidly limit forward movement of said first upset cylinder, a second vretically disposed elongated abutment plate associated with said second upset cylinder, means to guide said second abutment plate in vertical movement, said second abutment plate having longitudinally disposed gage face portions thereon of progressively decreasing thickness from top to bottom, said second abutment plate and said second upset cylinder being so arranged that said last mentioned gage face portions operate to rigidly limit forward movement of said second upset cylinder, and means interconnecting said first and second abutment plates operative upon movement of said first abutment plate into a predetermined gaging position to move said second abutment plate into a corresponding gaging position.

7. Apparatus according to claim 8 further characterized by said means interconnecting said first and second abutment plates comprising a cable-like member secured to the lower end portion of each of said abutment plates and pulley-like members positioned in fixed relation to each of said plates substantially above the end portion thereof, said cable-like member extending between said abutment plates and over said pulley-like members, and said abutment plates being substantially of the same weight.

8. In electric resistance flash-butt welding apparatus of the type having fixed and movable work-holding platens, spaced first and second upset cylinders for moving said movable platen toward and away from said fixed platen, and means including abutment means associated with each of said upset cylinders for limiting the forward movement of said movable platen toward said fixed platen; the improvement in said abutment means which comprises first and second abutment plates associated with said first and second upset cylinders respectively, each of said abutment plates having longitudinally disposed progressively changing gage face portions adapted to coact with said cylinders to rigidly limit forward movement of said platen, means to guide each of said cylinders in longitudinal movement whereby any of said gage face portions may be moved into operative relation with said upset cylinders, and means interconnecting said first and second abutment plates whereby movement of said first abutment plate to present a certain of said gage face portions in operative relation with said first upset cylinder will cause related movements of said second abutment plate to present a corresponding gage face portion into operative relation with said second upset cylinder.

9. Apparatus according to claim 8 further characterized by said abutment plates being vertically disposed, and further including means to counterbalance the weight of each of said abutment plates.

10. In electric resistance flash-butt welding apparatus of the type having fixed and movable work-holding platens, means to move said movable platen toward and away from said fixed platen, and means including spaced abutment means for limiting the forward movement of said movable platen toward said fixed platen; the improvement in said abutment means which comprises a spaced pair of elongated vertically disposed abutment members, means to guide said abutment members in vertical movement, means on one of said platens adapted to engage said abutment plates to prevent further forward movement of said movable platens, said means to guide being carried by the other of said platens, one of said abutments having longitudinally disposed gage face portions of progressively increasing thickness from top to bottom, the other of said abutments having longitudinally disposed gage face portions of progressively decreasing thickness from top to bottom, and means interconnecting said abutment plates operative upon movement of one of said plates in a first vertical direction to move the other of said plates in a second vertical direction.

11. In electric resistance flash-butt welding apparatus of the type having fixed and movable work-holding platens, means to move said movable platen toward and away from said fixed platen, and means including spaced abutment means for limiting the forward movement of said movable platen toward said fixed platen; the improvement in said abutment means which comprises a spaced pair of elongated abutment plates carried in normally fixed relation to one of said platens and adapted to engage means mounted in fixed relation to the other of said platens to rigidly limit forward movement of said movable platen, said abutment plates having longitudinally disposed gage face portions of progressively changing thickness, said abutment plates being adapted for longitudinal adjusting movement to bring any of said gage face portions into operative position, and means interconnecting said abutment plates operative upon movement of one of said plates to bring a certain of said gage face portions into operative position to move the other of said plates to bring a corresponding gage face portion thereof into operative position.

MELVIN M. SEELOFF.
ROBERT ANDERSON.

No references cited.